United States Patent
Al-Taq et al.

(10) Patent No.: US 10,975,293 B2
(45) Date of Patent: Apr. 13, 2021

(54) METHODS FOR TREATING A SUBTERRANEAN FORMATION WITH A FOAMED ACID SYSTEM

(71) Applicant: Saudi Arabian Oil Company, Dhahran (SA)

(72) Inventors: Ali Abdullah Al-Taq, Qatif (SA); Zuhair A. Al-Yousif, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/520,907

(22) Filed: Jul. 24, 2019

(65) Prior Publication Data

US 2021/0024815 A1 Jan. 28, 2021

(51) Int. Cl.
  *C09K 8/72* (2006.01)
  *E21B 43/26* (2006.01)
  *C09K 8/70* (2006.01)

(52) U.S. Cl.
  CPC .............. *C09K 8/72* (2013.01); *C09K 8/703* (2013.01); *E21B 43/26* (2013.01)

(58) Field of Classification Search
  CPC ............ C09K 8/72; C09K 8/703; E21B 43/26
  USPC ....................................................... 166/300
  See application file for complete search history.

(56) References Cited

U.S. PATENT DOCUMENTS

| | | |
|---|---|---|
| 4,232,741 A | 11/1980 | Richardson et al. |
| 4,737,296 A | 4/1988 | Watkins |
| 4,846,277 A * | 7/1989 | Khalil .................... C09K 8/703 166/280.1 |
| 7,148,184 B2 | 12/2006 | Francini et al. |
| 7,464,754 B1 | 12/2008 | Decker et al. |
| 9,701,894 B2 | 7/2017 | Al-Nakhli et al. |

(Continued)

FOREIGN PATENT DOCUMENTS

| | | |
|---|---|---|
| CN | 108690595 A | 10/2018 |
| RU | 2197606 C1 | 1/2003 |

(Continued)

OTHER PUBLICATIONS

Davies et al., "Carbonate Stimulation", Middle East & Asia Reservoir Review, 2007, 7 pgs.

(Continued)

*Primary Examiner* — Zakiya W Bates
*Assistant Examiner* — Ashish K Varma
(74) *Attorney, Agent, or Firm* — Dinsmore and Shohl LLP

(57) ABSTRACT

A method for treating a subterranean formation with a foamed acid system is disclosed. The method includes introducing a treatment fluid into the formation. The treatment fluid includes a first solution and a second solution. The first solution includes an ammonium containing compound and an acid. The second solution includes a nitrite containing compound. One or both of the solutions further include a foaming agent. The solutions are mixed within the formation to generate a nitrogen gas. The method further includes, allowing the compounds to generate nitrogen in the presence of the foaming agent to form a foam and generate the foamed acid system within the formation. The acid present in the foamed acid system reacts with soluble substances in the subterranean formation to increase permeability of the subterranean formation and enable enhanced production of reservoir fluids.

18 Claims, 4 Drawing Sheets

(56) References Cited

U.S. PATENT DOCUMENTS

| | | | |
|---|---|---|---|
| 2004/0177960 | A1 | 9/2004 | Chan et al. |
| 2007/0235189 | A1 | 10/2007 | Milne et al. |
| 2009/0281005 | A1* | 11/2009 | Qu .......................... C09K 8/68 507/237 |
| 2013/0126169 | A1* | 5/2013 | Al-Nakhli ............... C09K 8/68 166/300 |
| 2013/0180720 | A1* | 7/2013 | Al-Dahlan .............. C09K 8/72 166/307 |
| 2015/0000912 | A1* | 1/2015 | Choudhary .......... E21B 36/008 166/300 |
| 2015/0300143 | A1 | 10/2015 | Al-Nakhli et al. |
| 2015/0361328 | A1* | 12/2015 | Almutairi .............. C09K 8/592 166/300 |
| 2016/0265326 | A1 | 9/2016 | Nguyen et al. |
| 2016/0319182 | A1* | 11/2016 | Al-Nakhli ........... E21B 43/2405 |
| 2017/0145303 | A1 | 5/2017 | Fontenelle et al. |
| 2018/0291720 | A1 | 10/2018 | Cairns et al. |

FOREIGN PATENT DOCUMENTS

| | | | |
|---|---|---|---|
| WO | 2013109768 | A1 | 7/2013 |
| WO | 2013181229 | A2 | 12/2013 |
| WO | 2014149524 | A1 | 9/2014 |
| WO | 2017058193 | A1 | 4/2017 |
| WO | 2018187565 | A1 | 10/2018 |

OTHER PUBLICATIONS

Al-Nakhli et al., "Chemically-Induced Pressure Pulse: A Novel Fracturing Technology for Unconventional Reservoirs", Society of Petroleum Engineers, 2015, 14 pgs.

Al-Nakhli et al., "Overcoming Unconventional Gas Challenges by Creating Synthetic Sweetspot and Increasing Drainage Area", Society of Petroleum Engineers, 2013, 15 pgs.

Nguygen et al., "Kinetics and mechanism of the reaction between ammonium and nitrite ions: experimental and theoretical studies", Chemical Engineering Scient 58 (2003) 4351-4362, 12 pgs.

Glasbergen et al., "Injectivity Loss in Polymer Floods: Causes, Preventions and Mitigations", Society of Petroleum Engineers, 2015, 15 pgs.

Yerramilli et al., "Novel Insight into Polymer Infectivity for Polymer Flooding", Society of Petroleum Engineers, 2013, 23 pgs.

Farajzadeh et al., "Simultaneous Sorption and Mechanical Entrapment During Polymer Flow Through Porous Media", Society of Petroleum Engineers, 2015, 24 pgs.

Sanchez et al., "Acid Fracturing Tight Gas Carbonates Reservoirs Using CO2 to Assist Stimulation Fluids: An Alternative to Less Water Consumption while Maintaining Productivity", Society of Petroleum Engineers, 2015, 13 pgs.

Office Action dated Mar. 12, 2020 pertaining to U.S. Appl. No. 16/520,887, filed Jul. 24, 2020, 24 pgs.

International Search Report and Written Opinion dated Mar. 31, 2020 pertaining to International application No. PCT/US2019/056708 filed Oct. 17, 2019, 13 pgs.

International Search Report and Written Opinion dated Aug. 5, 2020 pertaining to International application No. PCT/US2020/032064 filed May 8, 2020, 13 pgs.

International Search Report and Written Opinion dated Jul. 20, 2020 pertaining to International application No. PCT/US2020/030353 filed Apr. 29, 2020, 13 pgs.

Office Action dated Jun. 29, 2020 pertaining to U.S. Appl. No. 16/520,887, filed Jul. 24, 2019, 16 pgs.

Office Action dated Jul. 7, 2020 pertaining to U.S. Appl. No. 16/412,962, filed May 15, 2019, 29 pgs.

Office Action dated Jul. 27, 2020 pertaining to U.S. Appl. No. 16/851,589, filed Apr. 17, 2020, 25 pgs.

Notice of Allowance and Fee(s) Due dated Oct. 23, 2020 pertaining to U.S. Appl. No. 16/520,887, filed Jul. 24, 2019, 8 pgs.

International Search Report and Written Opinion dated Jul. 16, 2020 pertaining to International application No. PCT/US2020/024150 filed Mar. 23, 2020, 13 pgs.

Office Action dated Nov. 4, 2020 pertaining to U.S. Appl. No. 16/412,962, filed May 15, 2019, 19 pgs.

Notice of Allowance and Fee(s) Due dated Dec. 7, 2020 pertaining to U.S. Appl. No. 16/412,962, filed May 15, 2019, 12 pgs.

Office Action dated Nov. 4, 2020 pertaining to U.S. Appl. No. 16/851,589, filed Apr. 17, 2020, 20 pgs.

Notice of Allowance and Fee(s) Due dated Nov. 30, 2020 pertaining to U.S. Appl. No. 16/851,589, filed Apr. 17, 2020, 12 pgs.

* cited by examiner

METHODS FOR TREATING A SUBTERRANEAN FORMATION WITH A FOAMED ACID SYSTEM

TECHNICAL FIELD

The present disclosure relates to treating a subterranean formation to increase hydrocarbon production.

BACKGROUND

Foamed acid systems are used in acid stimulation and acid fracturing treatments due to offering several advantages compared to traditional non-foamed systems, such as reduced fluid content, superior fluid loss control, increased viscosity, reduced friction, and quicker cleanup. Additionally, Foamed acid systems reduce the reactivity of the acid when compared to conventional acid treatments. Such reduced reactivity allows subsequent portions of the acid treatments to be diverted away from areas of the subterranean formation that have already been treated and allows for deeper and more complete treatment of the formation. Consequently, the reduced acid reactivity allows for deeper fracture penetration and increased fracture conductivity throughout the length of fractures, which may be induced during the treatment.

SUMMARY

Foamed acid systems are conventionally produced by injecting a gas into an acid system that contains a foaming agent. Gas may be injected into an acid system already present within the subterranean formation, injected into the subterranean formation simultaneously with the acid system, or injected into the acid system prior to being injected into the subterranean formation. However, the direct injection of a gas or previously generated foam into a wellbore consumes significant amounts of energy due to the challenges of pumping a gas or greatly viscous foam at a sufficient rate. Further, foamed acid systems may not be achievable when using such conventional methods during acid fracturing and acid stimulation treatments within some subterranean formations. This may be due to various factors, such as the limitations of pumping equipment and the necessity of achieving the required injection rates during treatments. For example, as the maximum achievable pressure increases, the rate at which gas may be injected into a subterranean formation decreases dramatically. As such, conventional methods may fail to achieve a foamed acid system within some subterranean formations, resulting in the treatment of the subterranean formation with an energized fluid system. Energized fluid systems may lack many of the benefits of a foamed system, such as reduced acid reactivity and increased transport capability, due to the decreased viscosity when compared to a foamed acid system. Prior attempts to achieve a foamed acid system in some subterranean formations have resulted in only energized fluids with an average foam quality of from about 6.5% to about 10.3%, less than the average foam quality of about 52% necessary to achieve a foamed system.

Accordingly, a need exists for alternative methods that readily generate a viscous foamed acid system that may be used in treatments of subterranean formations. To this end, the embodiments described in the present disclosure disclose a method for treating a subterranean formation with a foamed acid system that can overcome the limitations of traditional foamed acid systems by the in-situ generation of the gas required to form a foamed acid system subsequent to injection within the subterranean formation. Specifically, the foamed acid system is generated within the formation, reducing or eliminating the difficult task of transporting or pumping a gas or foam deep within the formation.

According to one embodiment, a method for treating a subterranean formation with a foamed acid system is disclosed. The method includes introducing a treatment fluid into the formation. The treatment fluid includes a first solution and a second solution. The first solution includes an ammonium containing compound and an acid. The second solution includes a nitrite containing compound. One or both of the solutions further include a foaming agent. The solutions are mixed within the formation to generate a nitrogen gas. The method further includes allowing the compounds to generate the nitrogen gas in the presence of the foaming agent to form a foam and generate the foamed acid system within the formation. The acid present in the foamed acid system reacts with soluble substances in the subterranean formation to increase permeability of the subterranean formation and enable enhanced production of reservoir fluids.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
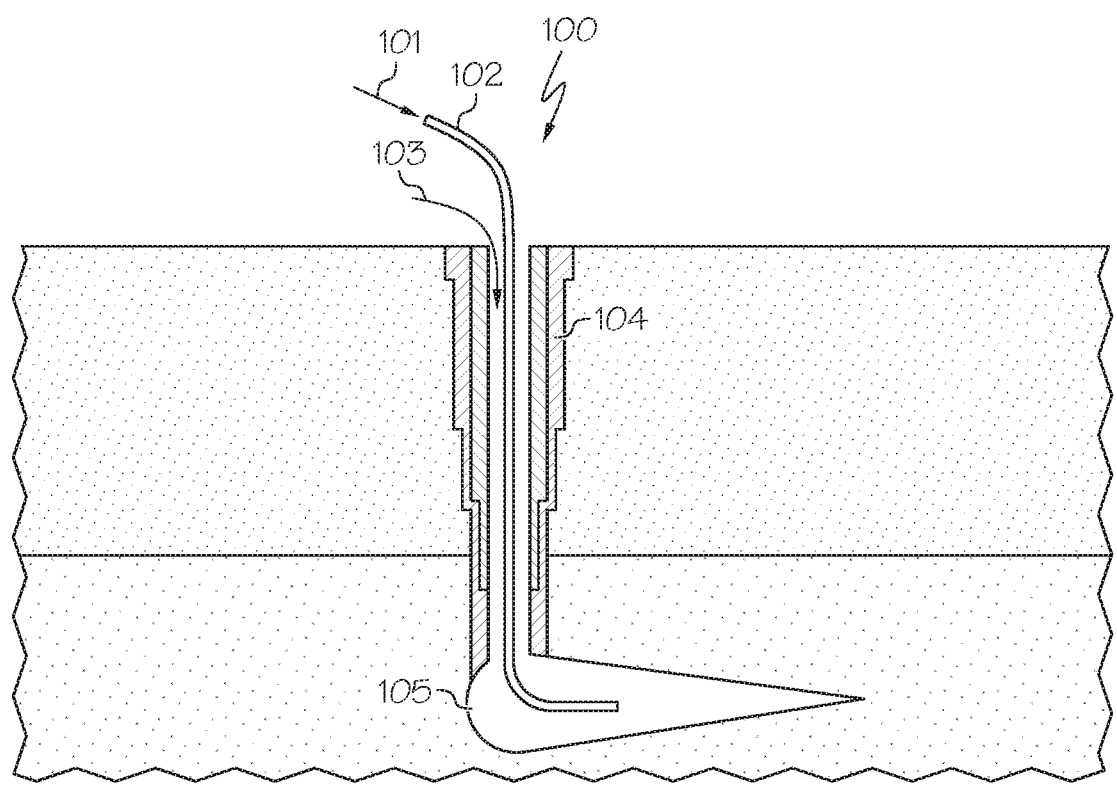
FIG. 1 is a schematic drawing of a wellbore used for acid stimulation treatment operations.

Reference will now be made in greater detail to various embodiments, some embodiments of which are illustrated in the accompanying drawings.

DETAILED DESCRIPTION

Reference will now be made in detail to embodiments of methods for treating a subterranean formation with a foamed acid system.

As used throughout this disclosure, the term "acid stimulation treatment" refers to the treatment of a subterranean formation with a stimulation fluid containing a reactive acid. In sandstone formations, the acid reacts with the soluble substances in the formation matrix to enlarge the pore spaces. In carbonate formations, the acid dissolves the entire formation matrix. In each case, the matrix acidizing treatment improves the formation permeability to enable enhanced production of reservoir fluids. Matrix acidizing operations are ideally performed at pressures below the fracture pressure of the formation. This enables the acid to penetrate the formation and extend the depth of treatment while avoiding damage to the reservoir formation.

As used throughout this disclosure, the term "foam quality" refers to the ratio of the volume of gas to the total volume of gas and liquid in a foamed system.

As used throughout this disclosure, the term "energized fluid system" refers to a treatment fluid that includes at least one compressible, sometimes soluble, gas phase. The average foam quality of an energized fluid system is generally less than 52%.

As used throughout this disclosure, the term "carbonate" refers to a class of sedimentary rock that comprises 95% or more by weight calcite ($CaCO_3$), aragonite (also $CaCO_3$), and dolomite ($CaMg(CO_3)_2$). Dolomite is a mineral that can replace calcite during the process of dolomitization. Limestone, dolostone or dolomite, and chalk are carbonate rocks. Carbonate rocks can serve as hydrocarbon reservoir rocks, particularly if their porosity has been enhanced through dissolution. Fractures augment permeability of subterranean formations to allow for flow and extraction of hydrocarbon reservoirs trapped within the reservoir rocks.

As used throughout this disclosure, the term "carbonate scaling" refers to a type of mineral deposit buildup that may be found on the wellbore, tubulars, and other components of the drilling rig as the saturation of produced water is affected by changing temperature and pressure conditions in the subterranean formation.

As used throughout this disclosure, the term "production tubing" refers to a wellbore tubular used to produce reservoir fluids. Production tubing is assembled with other completion components to make up the production string. The production tubing selected for any production string should be compatible with the wellbore geometry, reservoir production characteristics, and the reservoir fluids.

As used throughout this disclosure, the term "coiled tubing" refers to a long, continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing.

As used throughout this disclosure, the term "hydraulic fracturing" refers to a stimulation treatment routinely performed on hydrocarbon wells in low-permeability reservoirs, such as reservoirs with a permeability of less than 10 milliDarcys (mD). Hydraulic fracturing fluids are pumped into a subsurface formation, causing a fracture to form or open. The wings of the fracture extend away from the wellbore in opposing directions according to the natural stresses within the subsurface formation. Proppant may be mixed with the treatment fluid to keep the fracture open when the treatment is complete. Hydraulic fracturing creates communication with a subsurface formation and bypasses damage that may exist in the near-wellbore area.

As used throughout this disclosure, the term "formation matrix" refers to the finer grained, interstitial particles that lie between larger particles or in which larger particles are embedded in sedimentary rocks such as sandstones and conglomerates.

As used throughout this disclosure, the term "proppant" refers to particles mixed with fracturing fluids to hold fractures open after the pressure generated during a hydraulic fracturing treatment is relieved. In addition to naturally occurring sand grains, man-made or specially engineered proppants, such as resin-coated sand, or high-strength ceramic materials, such as sintered bauxite, may also be used. Proppant materials are carefully sorted for size and sphericity to provide an efficient conduit for production of fluid from the reservoir to the wellbore.

As used throughout this disclosure, the term "reservoir" refers to a subsurface formation having sufficient porosity and permeability to store and transmit fluids.

As used throughout this disclosure, the term "sandstone" refers to any formation primarily composed of silica, silicate minerals and various forms of feldspar and clays. The grains of sandstone rock are traditionally sand-sized. The term is commonly used to imply consolidated sand or a rock made of predominantly quartz sand, although sandstones often contain feldspar, rock fragments, mica and numerous additional mineral grains held together with silica or another type of cement. The relatively high porosity and permeability of sandstones make them good reservoir rocks.

As used throughout this disclosure, the term "subterranean formation" refers to a body of rock that is sufficiently distinctive and continuous from the surrounding rock bodies such that the body of rock can be mapped as a distinct entity. A subterranean formation is, therefore, sufficiently homogenous to form a single identifiable unit containing similar properties throughout the subterranean formation, including, but not limited to, porosity and permeability. A subterranean formation is the fundamental unit of lithostratigraphy.

As used throughout this disclosure, the term "wellbore" refers to the drilled hole or borehole, including the openhole or uncased portion of the well. Borehole may refer to the inside diameter of the wellbore wall or the rock face that bounds the drilled hole.

A method for treating a subterranean formation with a foamed acid system is provided by the present disclosure. Embodiments generally include two steps. A first step generally includes introducing a treatment fluid into the subterranean formation. The treatment fluid includes a first solution and a second solution. The first solution includes an ammonium containing compound and an acid. The second solution includes a nitrite containing compound. One or both of the first solution and the second solution further include a foaming agent. The first solution and the second solution are mixed within the subterranean formation. A second step generally includes maintaining the treatment fluid in the subterranean formation such that the ammonium containing compound and the nitrite containing compound react to generate nitrogen gas. Upon the generation of the nitrogen gas, the foaming agent is operative to generate a foam comprising the acid and the reaction products of the first solution with the second solution within the subterranean formation.

In the methods of the present disclosure, a treatment fluid is introduced into a subterranean formation. For example, the treatment fluid may be injected into the subterranean formation through the wellbore accessing the formation. The treatment fluid includes a first solution and a second solution. The first solution includes an ammonium containing compound and an acid. In some embodiments, the ammonium containing compound is an ammonium salt. For example, in some embodiments the ammonium containing compound is ammonium chloride ($NH_4Cl$), ammonium bromide ($NH_4Br$), ammonium nitrate ($NH_4NO_3$), ammonium nitrite ($NH_4NO_2$), ammonium sulfate (($NH_4)_2SO_4$), or ammonium carbonate (($NH_4)_2CO_3$). A variety of acids may be used in the embodiments. In some embodiments, the acid may be hydrochloric acid (HCl), hydrofluoric acid (HF), mud acid, clay acid, acetic acid ($CH_3COOH$), or formic acid (HCOOH) among others. The acid should be determined by the reactivity of the minerals that makeup the subterranean formation.

The second solution includes a nitrite containing compound. In some embodiments, the nitrite containing compound is a nitrite salt. For example, in some embodiments the nitrite containing compound is sodium nitrite ($NaNO_2$) or potassium nitrite ($KNO_2$). In some embodiments, the second solution is substantially free of acid prior to being introduced into the subterranean formation. "Substantially free" means that the second solution includes less than 5% by volume, less than 4% by volume, less than 3% by volume, less than 2% by volume, less than 1% by volume, or less than 0.1% by volume of an acid. Acid present in the second solution may result in undesirable nitric oxide and side product generation when the acid is mixed with the nitrite containing compound.

In some embodiments, the molar ratio of the nitrite containing compound to the ammonium containing compound in the treatment fluid is from 1:1 to 3:1. For example, in some embodiments the molar ratio of $NaNO_2$ to $NH_4Cl$ in the treatment fluid is from 1:1 to 3:1; from 1.5:1 to 3:1; from 2:1 to 3:1; from 2.5:1 to 3:1; from 1:1 to 2.5:1; from 1:1 to 2:1; from 1:1 to 1.5:1; from 1.5:1 to 2.5:1; from 1.5:1 to 2:1; or from 2:1 to 2.5:1. A greater molar ratio of $NaNO_2$ relative to $NH_4Cl$ may allow for an increased reaction rate. Additionally, a $NaNO_2$ to $NH_4Cl$ molar ratio of at least 2:1 may allow for the first solution and the second solution containing the reactants to be provided in a volumetric ratio of 1:1, which may provide practical industrial benefits. The concentration of $NaNO_2$ in the second solution and $NH_4Cl$ in the first solution may be selected based on the reaction kinetics of the system, the solubility of the compounds in water based on temperature, and the desired foam characteristics.

One or both of the first solution and the second solution also include a foaming agent. In embodiments, one or both of the first solution and the second solution may include a foaming agent in an amount of from 1 gallon per thousand gallons of solution (gpt) to 20 gpt, from 2.5 gpt to 20 gpt, from 5 gpt to 20 gpt, from 10 gpt to 20 gpt, from 15 gpt to 20 gpt, from 1 gpt to 15 gpt, from 1 gpt to 10 gpt, from 1 gpt to 5 gpt, or from 1 gpt to 2.5 gpt. In some embodiments, the foaming agent comprises a surfactant. Generally, surfactants are chemicals that reduce the surface tension of the treatment fluid or interfacial tension between treatment fluids, allowing for foam generation upon the production of nitrogen gas. In embodiments, the foaming agent is an acid tolerant surfactant. In some embodiments of the present disclosure, the treatment fluid may have a pH of less than or equal to 4.0. Therefore, in some embodiments the foaming agent must be able to maintain structural integrity in highly acidic (for example, a pH of 4.0 or less) environments without deterioration. Acid tolerant surfactants are able to operate in the acidic environments of such treatment fluids upon the generation of nitrogen gas.

In embodiments, the surfactant may stabilize the foamed system. Different types of surfactants, such as anionic, cationic, nonionic, amphoteric and zwitterionic surfactants, may be used to produce foam for a variety of applications. As such, the selection of surfactant should be determined by the desired application and the chemistry of the surfactant and foamed system. However, it should be understood that any compound that may stabilize the gas-liquid foamed system may be classified as a surfactant suitable for use in embodiments of the present disclosure. For example, surface modified nanoparticles may achieve the same stabilization effect as a conventional surfactant. Additionally, other materials, such as polymers and nanoparticles, may be used to improve the efficiency of the surfactant. For example, a polymer may be used to produce a more stable foamed system.

In embodiments, the first solution and the second solution are mixed within the subterranean formation. For example, the first solution and the second solution may first contact and mix upon injection of the first solution and second solution into the subterranean formation. The resulting treatment fluid is maintained in the subterranean formation, allowing the ammonium containing compound and the nitrite containing compound to react and generate nitrogen gas. For clarity and conciseness, Reaction 1 is described using $NH_4Cl$ as the ammonium containing compound and $NaNO_2$ as the nitrite containing compound. However, it should be understood by a person of ordinary skill in the art that compounds of similar class of reactants will generally react in a similar way as the example reaction schemes shown in Reaction 1. $NaNO_2$ and $NH_4Cl$ react to form nitrogen gas as illustrated by:

$$NH_4Cl + NaNO_2 \rightarrow N_2(g) + NaCl + 2H_2O + \Delta H(heat) \quad \text{REACTION 1}$$

The chemical equilibrium and reaction dynamics are affected by at least temperature, pressure, pH, and molar ratios of reactants. For example, when the molar ratio of $NaNO_2$ to $NH_4Cl$ is at least 1:1 the reaction may occur spontaneously at an acidic pH, such as equal to or less than 4.0, or at a temperature equal to or greater than 60° C. As an acid may be included in the first solution of the disclosed method, Reaction 1 may be triggered immediately upon mixing of the first and second solutions when the pH of the treatment fluid is less than or equal to 4.0. This allows the generation of nitrogen gas to occur spontaneously regardless of other environmental conditions upon mixing of the first and second solutions in those embodiments in which the nitrite containing compound comprises $NaNO_2$ and the ammonium containing compound comprises $NH_4Cl$.

In some embodiments, the pH of the treatment fluid is sufficiently acidic to trigger the reactions of the first solution and the second solution. The pH of the treatment fluid may be controlled, at least in part, by the concentration of the acid present in the first solution. In some embodiments, the pH of the treatment fluid is less than or equal to 7.0; less than or equal to 6.5; less than or equal to 6.0; less than or equal to 5.5; less than or equal to 5.0; less than or equal to 4.5; less than or equal to 4.0; less than or equal to 3.5; less than or equal to 3.0; less than or equal to 2.5; less than or equal to 2.0; less than or equal to 1.5; less than or equal to 1.0; or less than or equal to 0.5. For example, the pH of the treatment fluid may be from 0.0 to 7.0, from 0.0 to 6.0, from 0.0 to 5.0, from 0.0 to 4.0, from 0.0 to 3.0, from 0.0 to 2.0, from 0.0 to 1.0, from 1.0 to 7.0, from 1.0 to 6.0, from 1.0 to 5.0, from 1.0 to 4.0, from 1.0 to 3.0, from 1.0 to 2.0, from 2.0 to 7.0, from 2.0 to 6.0, from 2.0 to 5.0, from 2.0 to 4.0, from 2.0 to 3.0, from 3.0 to 7.0, from 3.0 to 6.0, from 3.0 to 5.0, from 3.0 to 4.0, from 4.0 to 7.0, from 4.0 to 6.0, from 4.0 to 5.0, from 5.0 to 7.0, from 5.0 to 6.0, or form 6.0 to 7.0. In accordance with one of more embodiments, it may be advantageous for the treatment fluid to have a pH less than or equal to 4.0 in environments where the temperature is not equal to or greater than 60° C., such as the entrance to the wellbore as opposed to downhole in the subterranean formation, but in-situ foam generation is still desired. However, if the pH of the treatment fluid is too acidic, the concentration of the ammonium containing compound is unnecessarily diluted and the subsequent resulting nitrogen gas and heat generation is unnecessarily decreased. Additionally, as the pH of the treatment fluid is increased, the potential of carbonate scaling occurring in the subterranean formation is enhanced. Therefore, it may be advantageous for the treatment fluid to have a sufficiently acidic pH for the spontaneous generation of nitrogen gas while also preventing the dilution of the ammonium containing compound in the first solution.

Upon generation of the nitrogen gas, the foaming agent present in the treatment fluid retains the generated nitrogen gas to generate a foamed acid system. Foamed acid systems may have an average Foam Quality (FQ) equal to or greater than about 52% once the generation of nitrogen gas has completed. Systems with a foma quality less than 52% are classified as an energized fluid system. The FQ of a foam may be calculated by:

$$FQ=VG/(VG+VL) \qquad \text{EQUATION 1}$$

where VG is the volume of gas and VL is the volume of liquid. However, due to the volume of gas being dependent on the injection and subterranean formation conditions, foam quality of the foamed acid system cannot be determined prior to the generation of the system within the formation. Further, where nitrogen gas is generated in-situ, the volume of gas will continue to increase as the reaction of the ammonium containing compound and the nitrite containing compound progresses to completion. As such, foam quality of the generated foamed acid system should be expected to be greater in portions of the subterranean formation where the ammonium containing compound and the nitrite containing compound are first mixed relative to portions of the subterranean formation that are a greater distance from the wellbore accessing the subterranean formation.

In some embodiments, the foamed acid system generated by the treatment fluid may have a viscosity sufficient to decrease the reactivity of the acid of the treatment fluid, transport additives, such as proppant, or both. In some embodiments, the foamed acid system generated by the treatment fluid may have a viscosity great than or equal to 2 centipoise (cP), greater than or equal to 10 cP, greater than or equal to 25 cP, greater than or equal to 50 cP, greater than or equal to 75 cP, or greater than or equal to 100 cP. For example, the foamed acid system generated by the treatment fluid may have a viscosity of from 2 cP to 100 cp, from 2 cP to 75 cP, from 2 cP, to 50 cP, from 2 cP to 25 cP, from 2 cP to 10 cP, from 10 cP to 100 cP, from 10 cP to 75 cP, from 10 cP to 50 cP, from 10 cP to 25 cP, from 25 cP to 100 cP, from 25 cP to 75 cP, from 25 cP to 50 cP, from 50 cP to 100 cP, from 50 cP to 75 cP, or from 75 cP to 100 cP. Foamed acids generally have a shear thinning property that causes the viscosity to decrease at increasing shear rates. It is well understood that an increased viscosity will result in a greater fracture width and that a reduced viscosity will result in a greater fracture length. A reduced viscosity may be desirable in order to achieve deep fracture lengths during some acid stimulation treatments. However, many of the advantageous properties of a foamed acid system, when compared to a conventional acid treatment, are diminished as the viscosity is reduced. Examples of such properties include, but are not limited to, diverting subsequent acid stages away from areas of the subterranean formation that have already been treated and effectively carry various fluid additives.

Acid Stimulation Treatment

In some embodiments, the treatment fluid comprises a stimulation fluid and the method disclosed supra is used to generate a foamed acid system for use in an acid stimulation treatment of the subterranean formation. In acid stimulation treatments the acid present in the stimulation fluid and the subsequently generated foamed acid system reacts with the minerals within the subterranean formation to improve the permeability and enable the enhanced production of recover fluids. In some embodiments, the acid stimulation treatment dissolves minerals within the subterranean formation to stimulate the subterranean formation and increase hydrocarbon production.

In subterranean formations that comprise sandstone, the acid reacts with the minerals in the formation matrix to enlarge the pore spaces. In subterranean formations that comprise carbonate, the acid dissolves the entire formation matrix. As such, in some embodiments, the minerals dissolved within the subterranean formation comprise calcite ($CaCO_3$). In other embodiments, the minerals dissolved within the subterranean formation comprise dolomite ($CaMg(CO_3)_2$). In other embodiments, the minerals dissolved within the subterranean formation comprise both calcite and dolomite.

In some embodiments, the stimulation fluid of the acid stimulation treatment is introduced into the subterranean formation at a pressure less than the fracturing pressure of the subterranean formation. When a stimulation fluid is injected into a subterranean formation at a pressure less than the fracturing pressure of the subterranean formation, the acid present in the generated foamed system is able to penetrate the formation and extend the depth of the acid stimulation treatment while avoiding damage to the formation.

In some embodiments, the first solution and the second solution of the stimulation fluid are introduced into the subterranean formation simultaneously as a single solution. As described supra, when the reaction conditions, such as pH, temperature, pressure, and molar concentrations, are favorable, the generation of the foamed acid system will occur spontaneously upon mixing of the first solution and the second solution. As the reaction will continue to generate heat and pressure as it progresses, it may be desirable to control where the reaction will occur. As such, the fluids may be introduced directly inside the subterranean formation simultaneously as a single solution.

In some embodiments, the first step of the method includes introducing the first solution and the second solution into the subterranean formation separately. In some aspects of the embodiments, the first solution is introduced into the subterranean formation through a coiled tubing and the second solution is introduced into the subterranean formation through a production tubing. In some other aspects of the embodiments, the second solution is introduced into the subterranean formation through the coiled tubing and the first solution is introduced into the subterranean formation through the production tubing. In some other aspects of the embodiments, the first solution introduced into the subterranean formation through a first coiled tubing and the second solution introduced into the subterranean formation through a second coiled tubing.

FIG. 1 is a schematic drawing of a wellbore 100 used for acid stimulation treatment operations where a first solution 101 is introduced into the subterranean formation 105 through a coiled tubing 102 and a second solution 103 is introduced into the subterranean formation 105 through a production tubing 104. The first solution 101 and the second solution 103 are introduced into the subterranean formation 105 at a flow rate such that the pressure created inside the subterranean formation 105 is sufficiently less than the fracturing pressure of the subterranean formation 105 so as to not cause fractures. The first solution 101 and the second solution 103 react as disclosed supra to generate a foamed acid system that reacts with the subterranean formation 105 to improve the permeability and enable the enhanced production of recovery fluids. Following the treatment, the foamed acid system breaks, with little risk of damage to the subterranean formation 105, and forms a mixture of liquid and gaseous nitrogen, which facilitates the cleanup process. Damage to the subterranean formation 105 can include the plugging of the pores of the subterranean formation 105 by particles within an injection fluid or by precipitates and sludge formed as a result of acid within the injection fluid reacting with the subterranean formation 105. Such damage may be minimized by the foamed acid system due to the significant decrease in volume after the system breaks and the decrease in acid reactivity due to the system.

Acid Fracturing Treatment

In some embodiments, the treatment fluid comprises a fracturing fluid and the method disclosed supra is used to generate a foamed acid system for use in an acid fracturing treatment of the subterranean formation. Acid fracturing treatments are hydraulic fracturing treatments that also utilize an acid in the fracturing fluid and are performed on oil and gas wells in low-permeability reservoirs. The acid present in the fracturing fluid and the subsequently generated foamed acid system reacts with the minerals within the subterranean formation to etch the minerals and provide conductive paths from the reservoir to the wellbore.

In some embodiments, the fracturing fluid of the acid fracturing treatment is introduced into the subterranean formation at a pressure greater than the fracturing pressure of the subterranean formation. When a fracturing fluid is injected into a subterranean formation at a pressure greater than the fracturing pressure of the subterranean formation fractures are induced perpendicular to the horizontal axis of the formation. The wings of such fractures extend away from the wellbore in opposing directions according to the natural stresses within the formation. Acid present in the fracturing fluid and the subsequently generated foamed acid system etches the faces of the induced fractures, providing conductive paths from the subterranean formation to the wellbore after the pressure is relieved.

In some embodiments, the first solution and the second solution of the fracturing are introduced into the subterranean formation simultaneously as a single solution. As described supra, when the reaction conditions, such as pH, temperature, pressure, and molar concentrations, are favorable, the generation of the foamed acid system will occur spontaneously upon mixing of the first solution and the second solution. As the reaction will continue to generate heat and pressure as it progresses, it may be desirable to control where the reaction will occur. As such, the fluids may be introduced into the subterranean formation simultaneously as a single solution and the reaction will not occur until the solution reaches the environmental conditions of the subterranean formation.

In some embodiments, the first step of the method includes introducing the first solution and the second solution into the subterranean formation separately. In some aspects of the embodiments, the first solution is introduced into the subterranean formation through a coiled tubing and the second solution is introduced into the subterranean formation through a production tubing. In some other aspects of the embodiments, the second solution is introduced into the subterranean formation through the coiled tubing and the first solution is introduced into the subterranean formation through the production tubing. In some other aspects of the embodiments, the first solution introduced into the subterranean formation through a first coiled tubing and the second solution introduced into the subterranean formation through a second coiled tubing.

Figure 2:
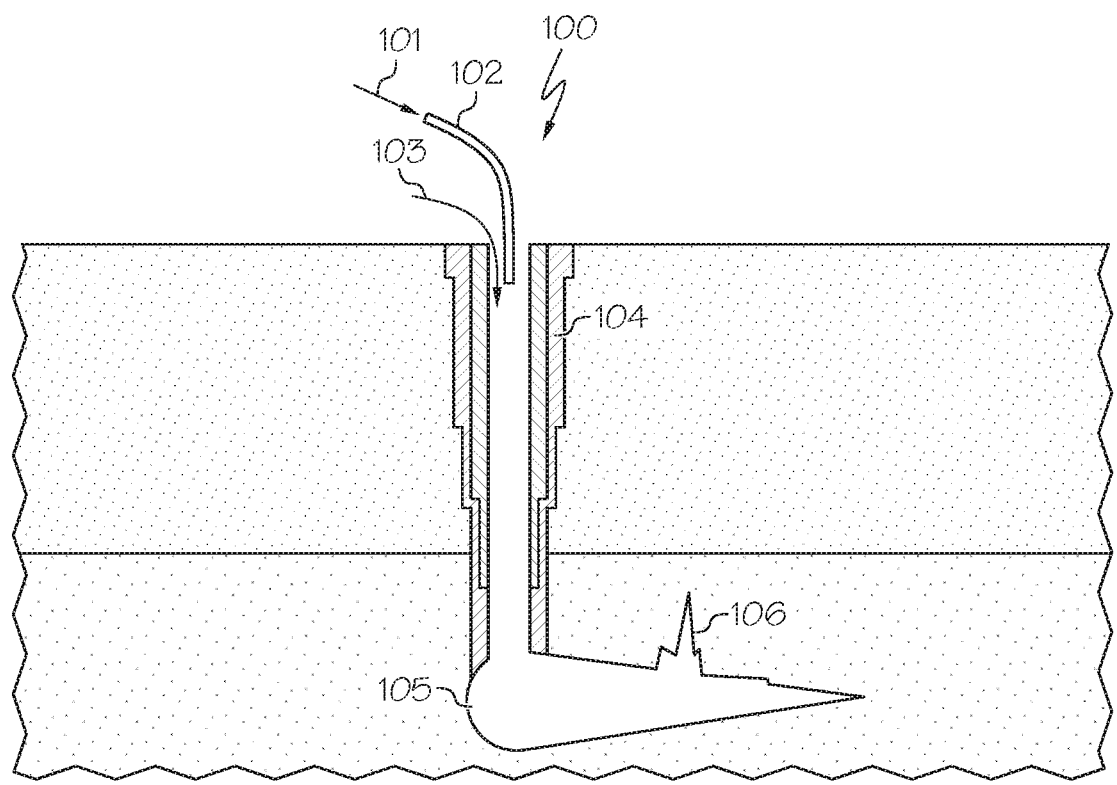
FIG. 2 is a schematic drawing of a wellbore used for acid fracturing treatment operations.

FIG. 2 is a schematic drawing of a wellbore 100 used for acid fracturing treatment operations where a first solution 101 is introduced into the subterranean formation 105 through a coiled tubing 102 and a second solution 103 is introduced into the subterranean formation 105 through a production tubing 104. Generally, the coiled tubing 102 can extend just inside or deep into the wellbore 100. The first solution 101 and the second solution 102 are introduced into the subterranean formation 105 at a flow rate such that the pressure created inside the subterranean formation 105 is sufficiently greater than the fracturing pressure of the subterranean formation 105 so as to cause fractures 106. The first solution 101 and the second solution 103 react as disclosed supra to generate a foamed acid system that reacts with the faces of the fractures 106 to etch them and provide conductive paths from the subterranean formation 105 to the wellbore 100. Following the treatment, the foamed acid system breaks, with little risk of damage to the subterranean formation 105 (as described supra), and forms a mixture of liquid and gaseous nitrogen, which facilitates the cleanup process.

In some embodiments, the fracturing fluid of the acid fracturing treatment may further comprise at least one fracturing fluid additive. Examples of fracturing fluid additives include, but are not limited to, gelling polymer, gelling stabilizer, crosslinker, breaker, and biocide. Crosslinker is a compound, typically a metallic salt, used to create a viscous gel used in some stimulation treatments. The crosslinker reacts with multiple-strand polymers to couple the molecules, increasing but closely controlling the fluid viscosity. Breaker is a chemical used to reduce the viscosity of fracturing fluids either as part of a treatment, such as allowing flow back of the spent treatment fluid. Breaker may be incorporated into the fracturing fluid for downhole activation. Biocide is an additive that kills bacteria and is commonly used in water muds containing natural starches and gums that are especially vulnerable to bacterial attack. Biocides can be used to control sulfate-reducing bacteria, slime-forming bacteria, iron-oxidizing bacteria and bacteria that attack polymers in fracture and secondary recovery fluids.

EXAMPLES

The following examples illustrate features of the present disclosure but are not intended to limit the scope of the disclosure.

Example 1

Figure 3:
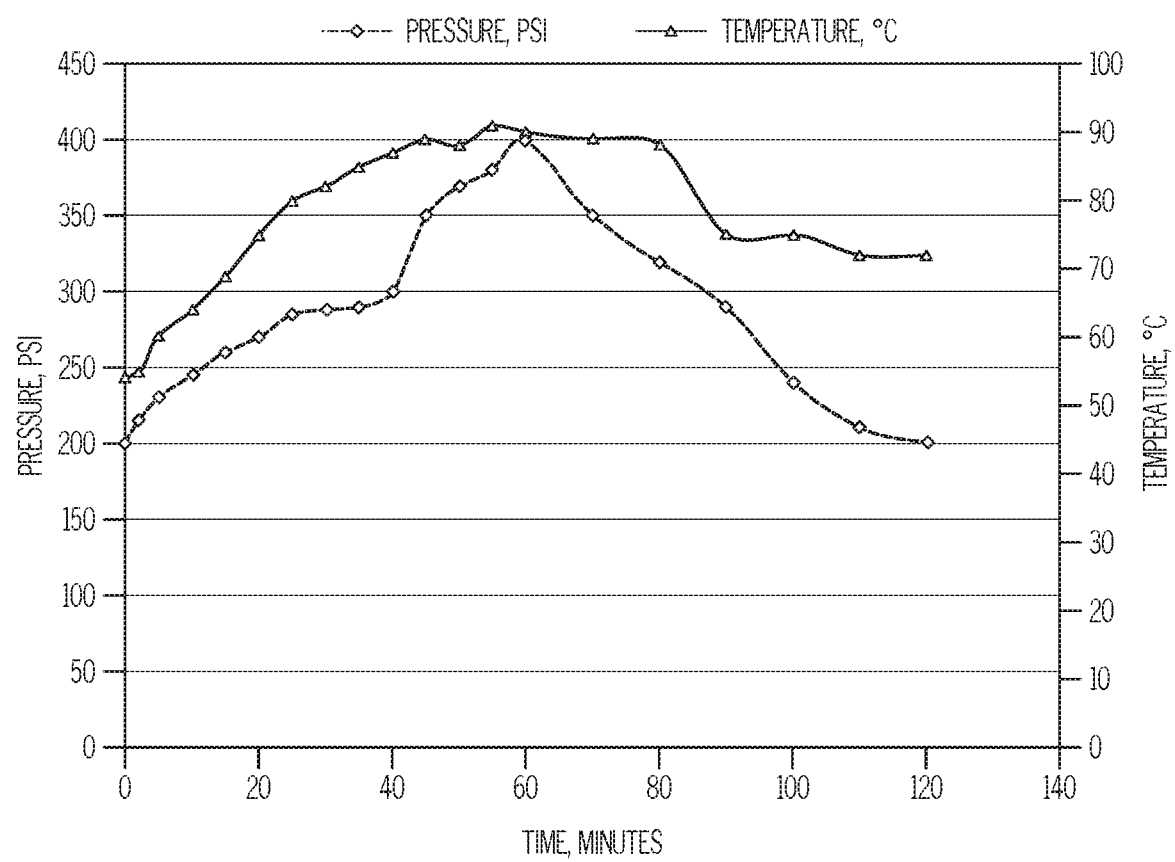
FIG. 3 is a graph illustrating temperature and pressure with respect to time during bench-top scale preparation of an exothermic reaction of ammonium chloride, sodium nitrite, and acetic acid, according to one or more embodiments described in this disclosure.

FIG. 3 shows an example in-situ foam generation by reaction of 110 milliliters (mL) of an aqueous solution including 36 mL NH$_4$Cl mixed with 10 mL CH$_3$COOH and 64 mL NaNO$_2$. This experiment was conducted using a standard 400 mL "High Temperature, High Pressure" (HT/HP) Cell under static conditions. The cell was first placed in a heating jacket for 20 minutes and allowed to reach 71° C. The reactants were placed inside the cell, which was then closed. The cell was then pressurized to 200 pounds per square inch (psi) to overbalance the pressure and the reaction was allowed to proceed for 2 hours. The temperature and pressure changes associated with the reaction were recorded and are presented in FIG. 3.

Referring to FIG. 3, the curves showing the temperature and the pressure throughout the reaction of NH$_4$Cl, NaNO$_2$, and CH$_3$COOH are presented. The temperature and pressure increased significantly from 54° C. and 200 psi to 91° C. and 400 psi, respectively, over the span of 60 minutes. The temperature increase is believed the result of the exothermic nature of the reaction. As evidenced by FIG. 3, the reaction of NH$_4$Cl and NaNO$_2$ is capable of generating a substantial increase of pressure within a formation. This pressure increase is believed to be the result of the generation of nitrogen gas as a product of the reaction, as detailed by Reaction 1 supra. This increase in pressure and generation of nitrogen gas may be useful in generating a foam in the presence of a foaming agent as well as increasing the pressure within a subterranean formation. That is, the embodiments of the present disclosure display suitable characteristics for the in situ generation of a foamed system within a subterranean formation. As further evidenced by FIG. 3, the pressure increase may occur over the course of 60 minutes or more. This reaction timeframe may be useful as it allows for positioning the reactants, for example, pumping a first solution and a second solution into a subterranean formation, in a low viscosity liquid-state prior to the increase of pressure and the generation of foam.

Example 2

Foam behavior simulation was conducted to determine viscosity and shear rate values in a simulated foam acid treatment process under subterranean formation conditions. Specifically, subterranean formation conditions with respect to both temperature and pressure were created for testing of both in-situ gas generated foamed acid systems in accordance with the present disclosure and conventional foamed acid systems. This experiment was conducted using a M9200 HT/HP Foam Loop Rheometer system available from Grace Instrument.

The rheometer was first calibrated with Newtonian fluids with a known viscosity to ensure the correct measurement of viscosities and subsequently put under a vacuum to remove all fluids. An NH$_4$Cl salt solution was first injected into the rheometer, followed by a solution of NaNO$_2$ salt and a methanol surfactant foamer commercially available as F107 from Schlumberger. The molar ratio of the NaNO$_2$ salt to the NH$_4$Cl salt within the solutions was approximately 2:1. The solutions were then allowed to equilibrate in the rheometer at a temperature of 60° C. The mixture was circulated in the capillary loop of the rheometer to ensure proper mixing and foam formation during the generation of nitrogen gas by the reaction between the two salts. Sample viscosities of the generated foamed system were then measured at different shear rates.

Viscosity ($\mu_{apparent}$) of the generated foamed system was calculated by:

$$\mu_{apparent} = \frac{\tau}{\gamma} \qquad \text{EQUATION 2}$$

where $\tau$ is the shear stress calculated by:

$$\tau = \frac{D\Delta P}{4L} \qquad \text{EQUATION 3}$$

$\gamma$ is the shear rate calculated by:

$$\gamma = \frac{8V}{D} \qquad \text{EQUATION 4}$$

and D is the tube diameter, ΔP is the differential pressure across the rheometer, L is the tube length, and V is the velocity.

The process was then repeated using a conventional foamed system. After calibration, an aqueous solution containing the foaming agent was injected into the rheometer, followed by an injection of nitrogen gas. A foam was generated in the loop and allowed to equilibrate in the rheometer at a temperature of 60° C. The foam was circulated in the capillary loop of the rheometer to ensure proper foam formation. Sample viscosities of the conventional foamed system were then measured at different shear rates.

Figure 4:
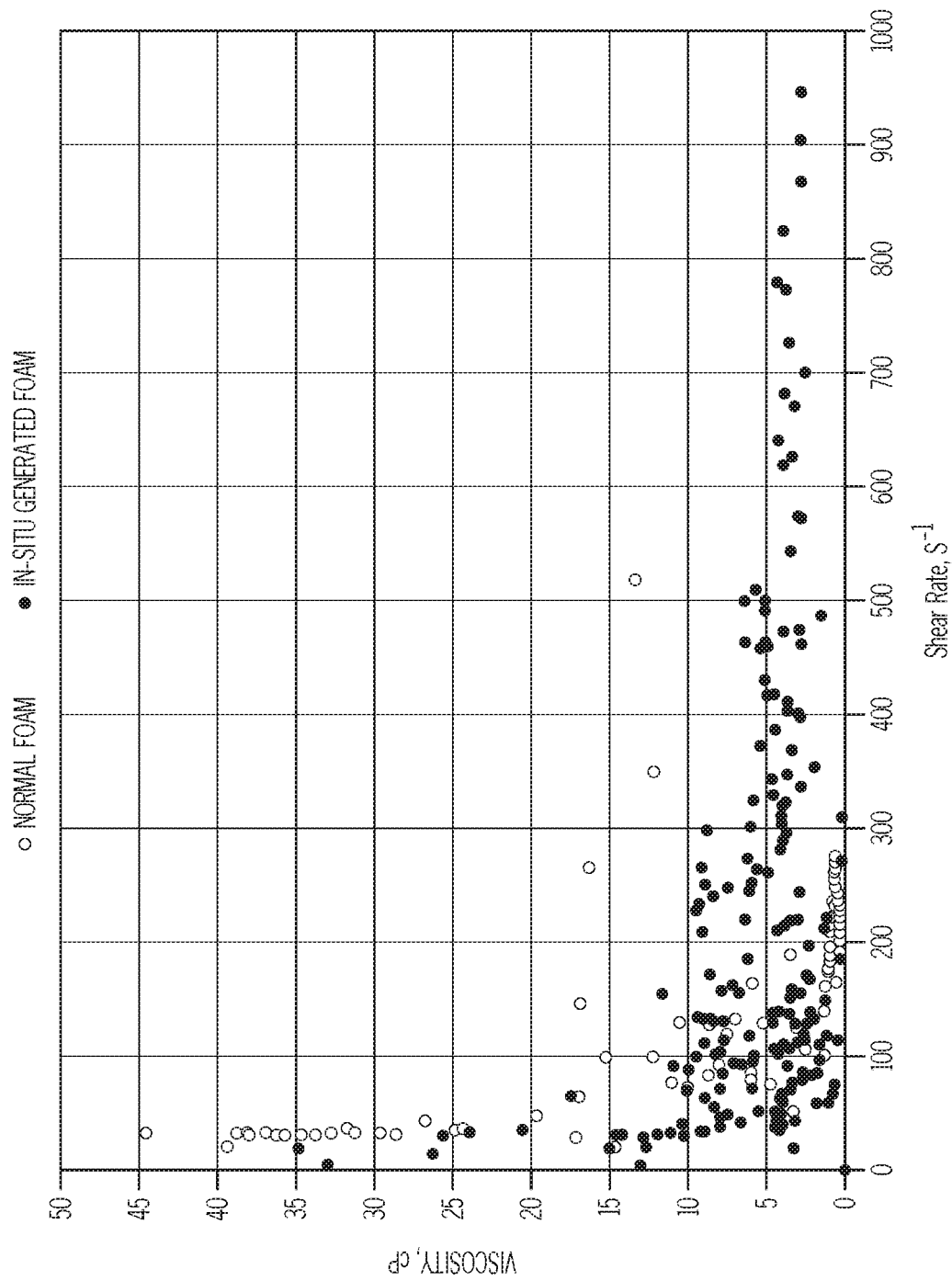
FIG. 4 is a graph comparatively illustrating the viscosity with respect to shear rate of a foamed acid conventionally generated using an external source of nitrogen and a foamed acid system generated, according to one or more embodiments described in this disclosure.

FIG. 4 plots the relationships between viscosity and shear rate at various points as the two foams are constantly circulated and sheared in the loop. Initially, at shear rates from about 0 inverse seconds (s$^{-1}$) to about 100 s$^{-1}$, conventional foamed acid had a maximum viscosity near about 45 cP and an average viscosity near about 35 cP. In-situ gas generated foamed acid had a maximum viscosity near about 35 cP and an average viscosity near about 10 cP. When the shear rate of the system increased from about 100 s$^{-1}$ to about 300 s$^{-1}$, the average viscosity of the conventional foamed acid dropped to about 1 cP while the average viscosity of the in-situ gas generated foamed acid remained near about 10 cP.

As evidenced by FIG. 4, in-situ generated foam is capable of achieving similar or superior viscosities when compared to conventional foam at various shear rates. Further, at lesser shear rates, the conventional foamed acid systems have a viscosity that will allow for the production of fractures with greater widths and the in-situ gas generated foamed acid systems have a viscosity that will allow for the production of fractures with greater depth. Further, at greater shear rates, the conventional foamed acid system displays a significant decrease in viscosity. As discussed previously, this reduced viscosity may prevent the foamed acid from diverting the subsequent acid treatments as well as reduce the transport capacity of the foam for additives such as proppant. As such, FIG. 3 demonstrates that the method presently disclosed is capable of generating a foamed system within a subterranean formation that displays comparable or superior properties in regard to other systems. That is, the method presently disclosed effectively eliminates the requirements of injecting foam or nitrogen gas without a loss of quality.

It should now be understood the various aspects of the method and associated treatment fluid for treating a subterranean formation to increase hydrocarbon production are described and such aspects may be utilized in conjunction with various other aspects.

In a first aspect, the disclosure provides a method for treating a subterranean formation with a foamed acid system. The method comprises introducing a treatment fluid into the formation. The treatment fluid comprises a first solution and a second solution. The first solution comprises an ammonium containing compound and an acid. The second solution comprises a nitrite containing compound. One or both of the solutions further comprise a foaming agent. The solutions are mixed within the subterranean formation to generate a nitrogen gas. The method further includes allowing the compounds to generate nitrogen in the presence of the foaming agent to form a foam and generate the foamed acid system within the subterranean formation. The acid present in the foamed acid system reacts with soluble substances in the subterranean formation to increase permeability of the subterranean formation and enable enhanced production of reservoir fluids.

In a second aspect, the disclosure provides the method of the first aspect in which the second solution comprises the foaming agent.

In a third aspect, the disclosure provides the method of the first or second aspects in which the average foam quality of the generated foam comprising the acid and the reaction products of the first solution and the second solution is at least 52%.

In a fourth aspect, the disclosure provides the method of any of the first through third aspects in which the first solution and the second solution are introduced into the subterranean formation separately. In some embodiments, the first solution may be introduced into the wellbore through a coiled tubing and the second solution may be introduced into the wellbore through a production tubing. In other embodiments, the second solution may be introduced into the wellbore through the coiled tubing and the first solution may be introduced into the wellbore through the production tubing. In other embodiments, the first solution may be introduced into the wellbore through a first coiled tubing and the second solution may be introduced into the wellbore through a second coiled tubing.

In a fifth aspect, the disclosure provides the method of any of the first through fourth aspects in which the nitrite containing compound comprises $NaNO_2$ and the ammonium containing compound comprises $NH_4Cl$.

In a sixth aspect, the disclosure provides the method of any of the first through fifth aspects in which the molar ratio of $NaNO_2$ to $NH_4Cl$ is from 1:1 to 2:1.

In a seventh aspect, the disclosure provides the method of any of the first through sixth aspects in which the pH of the treatment fluid is less than or equal to 4.0.

In an eighth aspect, the disclosure provides the method of any of the first through seventh aspects in which the foaming agent comprises an acid tolerant surfactant.

In a ninth aspect, the disclosure provides the method of any of the first through eighth aspects in which the viscosity of the generated foam comprising the acid and the reaction products of the first solution and the second solution is greater than or equal to 2 cP.

In a tenth aspect, the disclosure provides the method of any of the first through ninth aspects in which the soluble substances are minerals within the subterranean formation.

In an eleventh aspect, the disclosure provides the method of any of the first through tenth aspects in which the first solution and the second solutions are introduced downhole into the wellbore simultaneously as a single solution.

In a twelfth aspect, the disclosure provides the method of any of the first through eleventh aspects in which introducing the treatment fluid into the subterranean formation occurs at a pressure less than the fracturing pressure of the subterranean formation.

In a thirteenth aspect, the disclosure provides the method of the tenth aspect in which the minerals dissolved within the subterranean formation comprise one or both of calcite ($CaCO_3$) and dolomite ($CaMg(CO_3)_2$).

In a fourteenth aspect, the disclosure provides the method of any of the first through thirteenth aspects in which the treatment fluid comprises a fracturing fluid.

In a fifteenth aspect, the disclosure provides the method of the fourteenth aspect in which generation of the foamed system within the subterranean formation produces sufficient pressure from volumetric expansion within the subterranean formation to generate fractures in the subterranean formation. The fractures are geld open with a proppant provided with the fracturing fluid to create a conductive path from the production of fluids from the subterranean formation to the wellbore.

In a sixteenth aspect, the disclosure provides the method of the fifteenth aspect in which introducing the treatment fluid into the subterranean formation occurs at a pressure greater than the fracturing pressure of the subterranean formation.

In a seventeenth aspect, the disclosure provides the method of the fifteenth or sixteenth aspects in which one or both of the first solution and the second solution further comprises at least one fracturing fluid additive.

In an eighteenth aspect, the disclosure provides the method of any of the fifteenth through seventeenth aspects in which the fracturing fluid additive comprises gelling polymer, gelling stabilizer, crosslinker, breaker, or biocide.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A method for treating a subterranean formation with a foamed acid system, the method comprising the steps of:
   introducing a treatment fluid into the subterranean formation, the treatment fluid comprising a first solution and a second solution, in which:
      the first solution is introduced into the subterranean formation through a first tubing and comprises an ammonium containing compound and an acid,
      the second solution is introduced into the subterranean formation, separate from the first solution, through a second tubing and comprises a nitrite containing compound,
      one or both of the first solution and the second solution further comprises a foaming agent, and
      the first solution and the second solution are mixed within the subterranean formation to thereby generate nitrogen ($N_2$) gas; and
   allowing the ammonium containing compound and the nitrite containing compound to generate nitrogen gas in the presence of the foaming agent to form a foam and generate the foamed acid system within the subterranean formation,
   where the acid present in the foamed acid system reacts with soluble substances in the subterranean formation to increase permeability of the subterranean formation and enable enhanced production of reservoir fluids.

2. The method of claim 1, in which the second solution comprises the foaming agent.

3. The method of claim 1, in which the average foam quality of the generated foam comprising the acid and the reaction products of the first solution and the second solution is at least 52%.

4. The method of claim 1, in which:
   the first tubing is a coiled tubing and the second tubing is a production tubing, or
   the first tubing is a production tubing and the second tubing is a coiled tubing, or
   the first tubing is a first coiled tubing and the second tubing is a second coiled tubing.

5. The method of claim 1, in which the nitrite containing compound comprises $NaNO_2$ and the ammonium containing compound comprises $NH_4Cl$.

6. The method of claim 5, in which the molar ratio of $NaNO_2$ to $NH_4Cl$ is from 1:1 to 2:1.

7. The method of claim 1, in which the pH of the treatment fluid is less than or equal to 4.0.

8. The method of claim 1, in which the foaming agent comprises an acid tolerant surfactant.

9. The method of claim 1, in which the viscosity of the generated foam comprising the acid and the reaction products of the first solution and the second solution is greater than or equal to 2 cP.

10. The method of claim 1, in which the soluble substances are minerals within the subterranean formation.

11. The method of claim 10, in which the minerals dissolved within the subterranean formation comprise one or both of calcite ($CaCO_3$) and dolomite ($CaMg(CO_3)_2$).

12. The method of claim 1, in which the first solution and the second solutions are introduced downhole into the subterranean formation simultaneously as a single solution.

13. The method of claim 1, in which introducing the treatment fluid into the subterranean formation occurs at a pressure less than the fracturing pressure of the subterranean formation.

14. The method of claim 1, in which the treatment fluid comprises a fracturing fluid.

15. The method of claim 14, in which generation of the foamed system within the subterranean formation produces sufficient pressure from volumetric expansion within the subterranean formation to generate fractures in the subterranean formation, the fractures held open with a proppant provided with the fracturing fluid to create a conductive path for production of fluids from the subterranean formation to the wellbore.

16. The method of claim 15, in which introducing the treatment fluid into the subterranean formation occurs at a pressure greater than the fracturing pressure of the subterranean formation.

17. The method of claim 15, in which one or both of the first solution and the second solution further comprises at least one fracturing fluid additive.

18. The method of claim 17, in which the fracturing fluid additive comprises gelling polymer, gelling stabilizer, crosslinker, breaker, or biocide.

* * * * *